(12) United States Patent
Fricke

(10) Patent No.: US 12,310,807 B2
(45) Date of Patent: May 27, 2025

(54) DEVICE FOR SIMULATING JAW MOVEMENTS AND A METHOD FOR GENERATING THE DEVICE

(71) Applicant: xSNAP GmbH, Dachau (DE)

(72) Inventor: Manuel Fricke, Friedberg (DE)

(73) Assignee: xSNAP GmbH, Dachau (DE)

( * ) Notice: Subject to any disclaimer, the term of this patent is extended or adjusted under 35 U.S.C. 154(b) by 0 days.

(21) Appl. No.: 17/477,709

(22) Filed: Sep. 17, 2021

(65) Prior Publication Data
US 2022/0079719 A1     Mar. 17, 2022

(30) Foreign Application Priority Data

Sep. 17, 2020  (DE) .......................... 202020003948.9
Dec. 18, 2020  (EP) ..................................... 20215792
Jun. 29, 2021  (EP) ..................................... 21182436

(51) Int. Cl.
   *A61C 11/02*    (2006.01)
   *A61C 11/08*    (2006.01)
   (Continued)

(52) U.S. Cl.
   CPC ............ *A61C 11/02* (2013.01); *A61C 11/025* (2013.01); *A61C 11/084* (2013.01); *B33Y 80/00* (2014.12);
   (Continued)

(58) Field of Classification Search
   CPC ..... A61C 11/02; A61C 11/084; A61C 11/025; Y10T 403/3261; Y10T 403/32877;
   (Continued)

(56) References Cited

U.S. PATENT DOCUMENTS 3,624,906 A * 12/1971 Granger ............... A61C 11/022
                                                              433/59
4,449,930 A *  5/1984 Huffman ................ A61C 11/02
                                                              433/64
(Continued)

FOREIGN PATENT DOCUMENTS

DE    102015110020 A1   12/2016
EP        2079393 A1    7/2009
(Continued)

OTHER PUBLICATIONS

Search Report from European Application No. EP 21182436 dated Dec. 10, 2021.

*Primary Examiner* — Cris L. Rodriguez
*Assistant Examiner* — Sydney J Pulvidente
(74) *Attorney, Agent, or Firm* — Budzyn IP Law, LLC

(57) ABSTRACT

It is described a device for simulating jaw movements, the device comprising at least one first device unit attachable to an upper jaw model and at least one second device unit attachable to a lower jaw model, wherein the at least one first device unit comprises an engagement means and the at least one second device unit comprises one or more openings for receiving the engagement means, or vice versa, wherein the engagement means is arranged to perform a rotational movement and a translational movement within the one or more openings. It is further described a computer-implemented method for generating the device.

13 Claims, 9 Drawing Sheets

(51) Int. Cl.
  *B33Y 80/00* (2015.01)
  *G06F 30/17* (2020.01)
  *G06F 30/20* (2020.01)
  *G06F 113/10* (2020.01)

(52) U.S. Cl.
  CPC .............. *G06F 30/17* (2020.01); *G06F 30/20* (2020.01); *G06F 2113/10* (2020.01)

(58) Field of Classification Search
  CPC ....... Y10T 403/3285; Y10T 403/32893; Y10T 403/32851; Y10T 403/32867
  See application file for complete search history.

(56) References Cited

U.S. PATENT DOCUMENTS

| | | | |
|---|---|---|---|
| 5,342,360 A * | 8/1994 | Faccioli | A61B 17/6458 606/53 |
| 7,690,919 B2 | 4/2010 | Huffman | |
| 8,459,995 B1 * | 6/2013 | Aronov | A61C 11/08 433/213 |
| 2002/0009688 A1 * | 1/2002 | Van Valey | A61C 11/08 433/34 |
| 2002/0106238 A1 * | 8/2002 | Sanderson | F04B 27/0886 403/128 |
| 2005/0277086 A1 | 12/2005 | Arai et al. | |
| 2006/0204920 A1 * | 9/2006 | Costello | A61C 11/02 433/57 |

FOREIGN PATENT DOCUMENTS

| | | |
|---|---|---|
| JP | S4810869 B1 | 4/1973 |
| JP | 2016202498 A | 12/2016 |

\* cited by examiner

DEVICE FOR SIMULATING JAW MOVEMENTS AND A METHOD FOR GENERATING THE DEVICE

BACKGROUND OF THE INVENTION

The invention relates to a device for simulating jaw movements of a user, such as an articulator, and a method for generating the device.

Jaw movements of a user may be detected via analogous, e.g. mechanical or electrical, or digital measuring methods. Examples of such methods are known as axiography or condylographie. Using these methods, a physiological bite position, a jaw joint position, jaw movements as well as therapeutical and prosthetic treatments can be determined.

In one example, a facebow may be used to digitally determine jaw movements of a user or a patient and to generate, based on the determined jaw movements, data representing said jaw movements. Said data can be used to digitally simulate the jaw movements of the user. In addition, conventional plaster models of the upper and lower jaw of the user may be digitalised. In that manner, a realistic movement of the digital jaw models of the patient can be digitally simulated, for example assist in generating artificial dentition.

Alternatively, or additionally, the plaster models of the user's jaw may be attached to an articulator in order to simulate jaw movements of a user. Using the data generated via the facebow, a relative position of the articulator and the plaster models as well as corresponding movements of the articulator can be determined.

For example, plaster models of the upper and lower jaw are mounted in occlusion on such an articulator, e.g. via plaster or any other attachment means. The detected jaw movements may be used to configure the articulator to which the plaster models are attached. Then, by means of the articulator, the movement of the jaws with respect to each other can be simulated, which is indispensable in the production of artificial dentition, partial and total prostheses or mouth guards.

Moreover, in modern dentistry, digital impressions of the jaws are being produced ever more frequently. With the aid of the digital data a digital 3D jaw model or jaw partial model may be generated. These models are generally produced using a 3D printing technique. These printed jaw models or partial jaw models must then be mounted on the articulator in the same way as the conventional plaster models.

However, generating the jaw models, mounting the jaw models to an articulator and configure the articulator to perform movements similar to jaw movements of a user previously detected, represents an extensive and rather complicated method for simulating jaw movements of the user. In addition, the articulator can only be configured to a certain extent, thus limiting the degree of personalisation of the simulated jaw movements.

The object of the present invention is thus to provide an easily producible personalized device for simulating jaw movements of a user and a method for generating the device.

SUMMARY OF THE INVENTION

The solution of this consists of a device for simulating jaw movements, the device comprising at least one first device unit attachable to an upper jaw model and at least one second device unit attachable to a lower jaw model, wherein the at least one first device unit comprises an engagement means and the at least one second device unit comprises one or more openings for receiving the engagement means, or vice versa, wherein the engagement means is arranged to perform a rotational movement and a translational movement within the one or more openings.

The at least one first device unit may be attached to the upper jaw model. The at least one second device unit may be attached to the lower jaw model. In particular, the at least one first device unit and the upper jaw model may be one piece, i.e. made in one piece, for example printed via a 3D printing technology. Similarly, the at least one second device unit and the lower jaw model may be one piece, i.e. made in one piece, for example printed via a 3D printing technology.

The translational movement may comprise a translational movement in a protrusion direction, a laterotrusion direction and/or a mediotrusion direction. Furthermore, the rotational movement may result in movement of the first device unit relative to the second device unit in a laterotrusion direction, a mediotrusion direction and/or an opening direction.

In that manner, a device for simulation jaw movement, e.g. an articulator, is provided that can be easily manufactured, e.g. via 3D-print techniques and/or milling techniques. Furthermore, an articulator is provided that has a reduced number of components, thereby facilitating the constructure of the articulator. In addition, by allowing the engagement means to perform both rotational and translational movement within the one or more openings, a simplified device is provided that allows the simulation of jaw movements in a realistic and/or comprehensive manner.

In one embodiment, provision is made that the engagement means has a spherical shape, in particular wherein a diameter of the one or more openings is greater than a diameter of the engagement means.

For example, at least a part of the engagement means, in particular a part of the engagement means that is received or receivable by the one or more openings, has a spherical shape. In that manner, a uniform rotational movement of the engagement means within the one or more openings can be achieved. Hence, a more realistic jaw movement can be simulated, in particular a jaw movement that is consistent with an actual jaw movement that is to be simulated.

In one embodiment, provision is made that the rotational movement and/or the translational movement of the engagement means within the one or more openings results in a movement of the first device unit, in particular of the lower jaw model attached to the first device unit, in a laterotrusion direction, a mediotrusion direction and/or a protrusion direction relative to the second device unit, in particular relative to the upper jaw model attached to the second device unit; and/or wherein the one or more openings have an elongated shape; and/or wherein at least one first opening of the one or more openings is arranged, at least in part, parallel to a protrusion direction, a mediotrusion direction and/or a laterotrusion direction.

The one or more openings may further have a straight or curved shape or may have straight and/or curved shaped subsections. In that manner, realistic jaw movements may be simulated in a particularly intuitive way.

In one embodiment, provision is made that at least one second opening of the one or more openings is arranged non-parallel to the or a first opening of the one or more openings, and/or wherein the second opening and the first opening confine a first angle, in particular wherein at least one third opening of the one or more openings and the first opening confine a second angle, different from the first angle.

Thus, a respectively different opening may be provided to simulate different jaw movements. In particular, a movement of the engagement means within the first opening may result in a movement of the upper jaw model in a protrusion direction relative to the lower jaw model, a movement of the engagement means within the second or third opening may result in a movement of the upper jaw model in a laterotrusion and/or mediotrusion direction relative to the lower jaw model.

Furthermore, the device may comprise a plurality of second device units, in particular two second device units, wherein each of the plurality of second device units comprises a number of openings, e.g. a first, second and/or third opening, that are arranged differently, in particular wherein the first, second and/or third openings within the respective second device units are shaped differently and/or wherein the first, second and/or third openings of the respective second device unit confine a respective different angle. In that manner, a realistic simulation of jaw movement may be obtained in that particular movement restrictions are considered by way of the arrangement and shape of the respective one or more openings within the at least one second device unit.

In one embodiment, provision is made that the second device unit comprises an overlapping region in which a plurality of the one or more openings overlap and/or from which the engagement means is movable in any of the plurality of openings; and/or wherein a respective end portion of a or the plurality of the one or more openings overlap.

This is particularly advantageous as the engagement means can directly move from one opening into another opening without having to be removed from or taken out of the second device unit. Thus, the jaw movements can be simulated in a realistic and smooth way.

In one embodiment, provision is made that the engagement means comprises a spherical joint head and a cylindrical or elongated intermediate section coupling the spherical joint head and a body of the first device to which the upper jaw model is attachable or attached.

In that manner, a spherical part of the engagement means is provided that can uniformly perform rotational movements within the openings. The openings in turn may be provided in the inside of the second device unit. The intermediate section may thus couple the spherical part of the engagement means arranged in the inside of the second device unit with the rest of or the body of the first device unit.

A further advantage is that the intermediate section coupled to the spherical joint head within the one or more openings may reach through an entry opening or entry port of the second device unit. Thereby, the intermediate section may represent a limiting means that limits the rotational movement and/or translational movement of the spherical joint head within the one or more openings.

In one embodiment, provision is made that the one or more openings enclose the engagement means, at least in part, such that the engagement means is or can be arranged self-retaining within the one or more openings.

In other words: The spherical joint head may be formed such that it can be arranged within the one or more openings whilst being attached to the second device unit in a self-holding manner. For example, the one or more openings may comprise at least one entry port or entry opening that has a diameter smaller that diameter of the one or more openings and smaller than a diameter of the spherical joint head. The entry port or entry opening may have a flexible structure or may be made of a flexible material such that the engagement means, in particular the spherical joint head of the engagement means, may be positioned into the one or more openings through the entry port or entry opening. Thereby, a particularly simple way of attaching the first device unit to the second device unit is provided.

According to a further, possibly stand-alone, aspect of the invention. the solution consists of a computer-implemented method for generating any of the devices described above, wherein the method comprises: determining first data, wherein the first data is indicative of a movement in a protrusion direction, laterotrusion direction and/or mediotrusion direction of a user's lower jaw relative to a user's upper j aw; and determining, based on the first data, dimensions of the at least one first device unit and/or the at least one second device unit, in particular of the engagement means and/or the one or more openings.

In particular, the shape of the one or more openings or sections of the one or more openings may be determined. Moreover, the relative arrangement of the one or more openings within the second device unit may be determined. Additionally, or alternatively, the diameter of the spherical joint head and/or the diameter of the intermediate section that preferably has a cylindrical shape may be determined.

Hence, the method results in the generation of a personalized device, or articulator, that takes into account determined jaw movements of the user. The movements may be previously determined, either analogously or digitally, and be used to determine the dimensions of the device that correspond best to the detected jaw movements of the user.

For example, the first data my represent data points indicating a jaw movement. The first data may be converted to data representing a two or three dimensional geometry of the one or more openings. In particular, the data points may indicate a trajectory of one or more predetermined, in particular fixed, points or elements of the jaw, for example of a first part of the jaw relative to a second part of the jaw. Alternatively or additionally, the data points may indicate a trajectory of the one or more predetermined, in particular fixed, points or elements of the first part of the jaw in a coordinate system, the second part of the jaw being fixed within said coordinate system. More particularly, a number of data points may represent a movement of a first point or part of the jaw relative to a second point or part of the jaw. Based on said first data, e.g. said data points, the dimensions of the one or more openings of the at least one second device unit may be determined. For example, a two or three dimensional geometry or body may be determined. More particularly, the determined data points may be converted to circles, spheres or meshes which may be combined and the surface of the combined circles, spheres or meshs, i.e. the surface of a resulting two or three dimensional geometry or body, in particular the transition area between the combined spheres or meshes, may be flattened or smoothed. In that manner, one or more openings or dimensions thereof are determined, i.e. designed, in which the engagement means can perform movements in order to simulate the actual, detected jaw movements of the user.

In one embodiment, provision is made that that the method further comprises: detecting the movement in a protrusion direction, laterotrusion direction and/or mediotrusion direction of a user's lower jaw relative to a user's upper j aw; and/or wherein the dimensions are determined such that a movement of the first device unit, in particular of the lower jaw model attached to the first device unit, in a protrusion direction, a laterotrusion direction and/or a mediotrusion direction relative to the second device unit, in particular to the upper jaw model attached the second device unit, corresponds or approximately corresponds to the movement of the user's lower jaw in the protrusion direction, the laterotrusion direction and/or the mediotrusion direction relative to the user's upper jaw, respectively.

Additionally, or alternatively, the jaw movement of the user may be an opening or closing movement, i.e. an abduction and/or adduction movement. The first device unit may be arranged to perform only the movements relative to the second device unit that corresponds or approximately corresponds to one or more jaw movements of the user.

In one embodiment, provision is made that determining the dimensions of the at least one second device unit comprises determining a relative arrangement of the one or more openings within the at least one second device unit, and/or determining at least one of a position, a linear or curvilinear shape, a slope, a length and a diameter of the openings within and/or relative to the at least one second device unit; and/or wherein determining the dimensions of the at least one first device unit comprises determining a relative arrangement of the engagement means at or in the at least one first device unit, and/or determining at least one of a position, a size, a diameter and a length of the engagement means, in particular of the elongated intermediate section and/or the spherical joint head, at and/or relative to the first device unit.

In that manner, the degree of personalization of the device can be further increased. Hence, the simulation of the jaw movements of the user can be further improved.

In one embodiment, provision is made that the method further comprises determining second data, wherein the second data is indicative of one or more dimensions of at least a part of an upper jaw of the user and/or of at least a part of a lower jaw of the user; wherein determining the one or more dimensions of the at least one first device unit and the at least one second device unit is further based on the second data; and/or wherein the method further comprises: generating the first jaw model and/or the second jaw model, based on the second data, in particular printing and/or milling, the first jaw model and/or the second jaw model.

Hence, not only the movement of the user's upper jaw relative to the user's lower jaw is taken into account when generating the device, but also the dimensions of the user's upper jaw and lower jaw. Hence, for example, the size of the second device unit and/or the relative arrangement of the one or more openings within the second device unit may depend on the dimensions of the user's jaw. Similarly, the size of the first device unit and/or the relative arrangement of the engagement means at the first device unit may depend on the dimensions of the user's jaw. Therefore, even more realistic jaw movements may be simulated by means of the generated device. Alternatively or additionally, the second data may be used to realistically design and/or generate the upper or lower jaw model.

In one embodiment, provision is made that the method further comprises: generating, in particular printing and/or milling, the at least one first and second device units and the first and second jaw models; and attaching the at least one first device unit to the or a first jaw model and attaching the at least one second device unit to the or a second jaw model; or generating, in particular printing and/or milling, the at least one first device unit attached to the first jaw model and/or generating, in particular printing and/or milling, the at least one second device unit attached to the second jaw model, preferably in one piece, respectively.

The at least one first device unit and the at least one second device unit may be printed using a 3D printer or a 3D printing technique. In that manner, the device units may be precisely generated, in particular each in one piece. Hence, rather complicated arrangements of the engagement means and/or of the one or more openings within the first and second device unit, respectively, can be precisely realized in a cost and time effective manner.

Rather than attaching the model of the upper jaw to the at least one first device unit and the model of the lower jaw to the at least one second device unit, the first device unit and the model of the upper jaw may be generated, e.g. printed via a 3D printer, attached to each other, in particular in one piece. Likewise, the second device unit and the model of the lower jaw may be generated, e.g. printed via a 3D printer, attached to each other, in particular in one piece. In that manner, the process of generating a personalized and realistic device for simulating the jaw movements of a user is further enhanced, in particular simplified.

According to a further, possibly stand-alone, aspect of the invention an apparatus is provided comprising means for carrying out the steps of any of the above described methods.

According to a further, possibly stand-alone, aspect of the invention a computer-readable medium is provided comprising instructions which, when executed by a computer, cause the computer to carry out any of the above described methods.

According to a further, possibly stand-alone, aspect of the invention an articulator system is provided comprising any of the above described devices, wherein the at least one first device unit is attached to the upper jaw model and the at least one second device unit is attached to the lower jaw model.

BRIEF DESCRIPTION OF THE DRAWINGS

The invention will be described in more detail hereinafter with the aid of a number of preferred exemplified embodiments.

In the drawings.

DETAILED DESCRIPTION OF THE PREFERRED EMBODIMENTS

Figure 1:
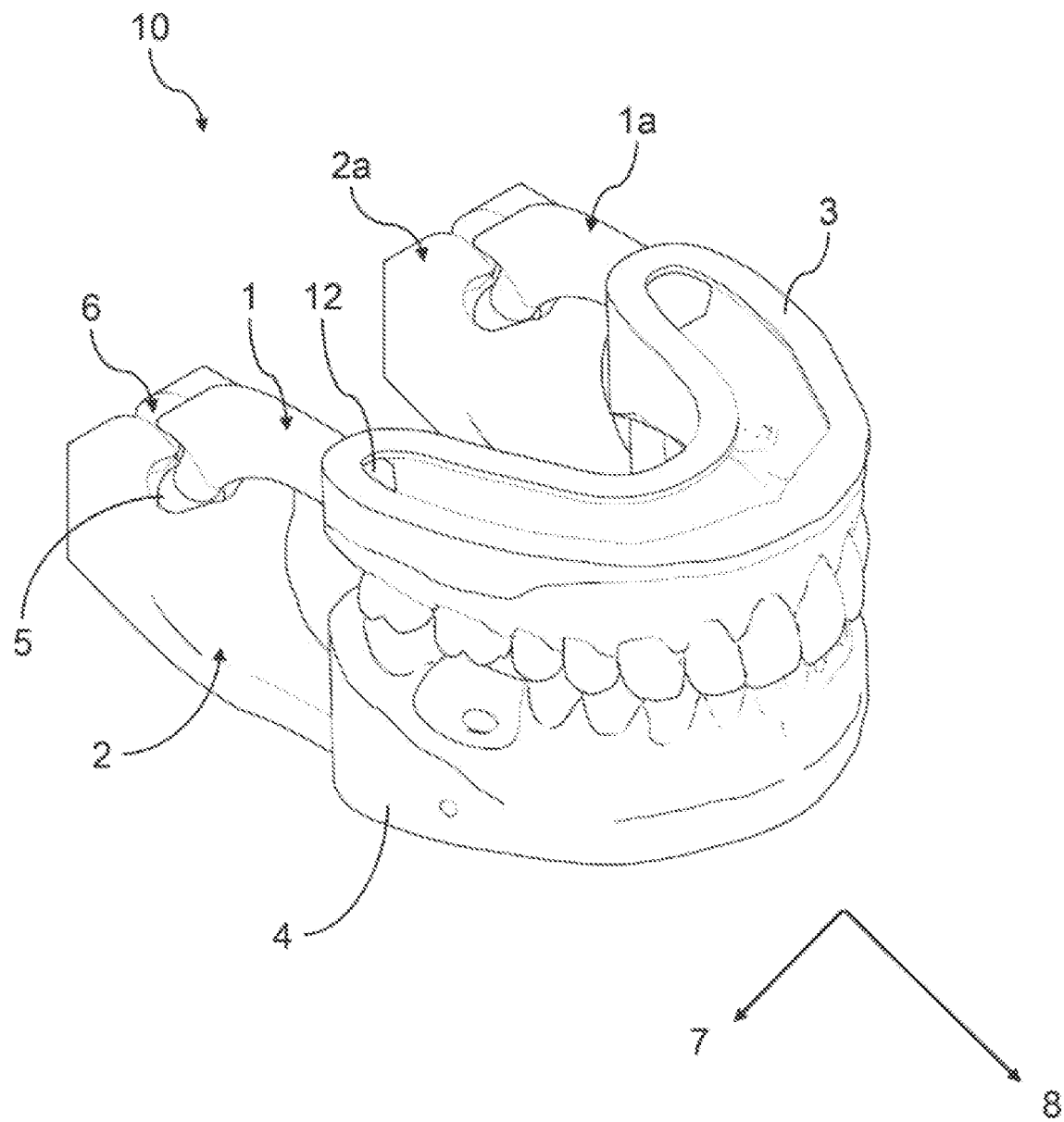
FIG. 1 shows a device for simulating jaw movements attached to a jaw model in a first three-dimensional view.

FIG. 1 shows a device 10 for simulating jaw movements in a first three-dimensional view. The device 10 can also be referred to as an articulator 10. The device 10 comprises two first device units 1, 1a that are attached to an upper jaw model 3. The first device units 1, 1a and the upper jaw model 3 may be made in one piece and may, for example, be printed via a 3D printing technology.

The device 10 further comprises two second device units 2, 2a that are attached to a lower jaw model 4. The second device units 2, 2a and the lower jaw model 4 may be made in one piece, and may, for example, be printed via a 3D printing technology.

The first device units 1, 1a are designed in the same or a similar way. In other words: The components of the first device unit 1 and the components of the other first device unit 1a may correspond or approximately corresponds to each other. Likewise, the components of the second device units 2, 2a may correspond to each other.

The first device unit 1 and the second device unit 2 are elongated. In particular, the first device unit 1 and the second device unit 2 each comprise an elongated portion.

The first device unit 1 comprises an engagement means 5. The engagement means 5 comprises a spherical joint head 9 and an intermediate section 11 (see FIG. 3). The spherical joint head 9 is attached to a body 12 of the engagement means 5 that is attached to the upper jaw model 3. The intermediate section 11 has a cylindrical shape.

The engagement means 5, more particularly the spherical joint head 9, is positioned within an opening 6 of the second device unit 2. The opening 6 may comprise one or more openings 6. The engagement means 5 is arranged such that it is movable within the openings 6. In particular, the spherical joint head 9 has a diameter that is smaller than a (respective) diameter of the one or more openings 6.

The one or more openings 6 may enclose the engagement means at least in part. In other words: The one or more openings 6 may surround or encircle at least a part of the spherical joint head 9, for example more than half of the spherical joint head 9. Put in yet another way: The one or more openings 6 may surround the spherical joint head such that the spherical joint head is attached in a self-retaining way within the one or more openings 6.

In a similar manner, the engagement means of the other first device unit 1a is movable within the openings of the other second device unit 2a, wherein the engagement means 5 and the one or more openings 6 of the respective first and second device units may have a different form or shape.

When moving the engagement means 5 within the one or more openings 6, the upper jaw model 3 performs a movement relative to the lower jaw model 4. More particularly, the upper jaw model 3 may perform a translational movement relative to the lower jaw model 4 in a protrusion direction 8 or in a laterotrusion direction 7 via a movement of the engagement means 5 within the one or more openings 6. Additionally or alternatively, the movement of the upper jaw model 3 relative to the lower jaw model 4 in the protrusion direction 8 or in the laterotrusion direction 7 may result from a rotational movement of the engagement means 5 within the opening 6. Furthermore, the upper jaw model 3 and the lower jaw model 4 may perform an opening movement in a direction perpendicular to the protrusion direction 8 and the laterotrusion direction 7 via a rotational movement of the engagement means 5 within the one or more openings 6. The laterotrusion direction 7 may be perpendicular or approximately perpendicular to the protrusion direction. A mediotrusion as mentioned above may be antiparallel to the laterotrusion direction 7.

Figure 2:
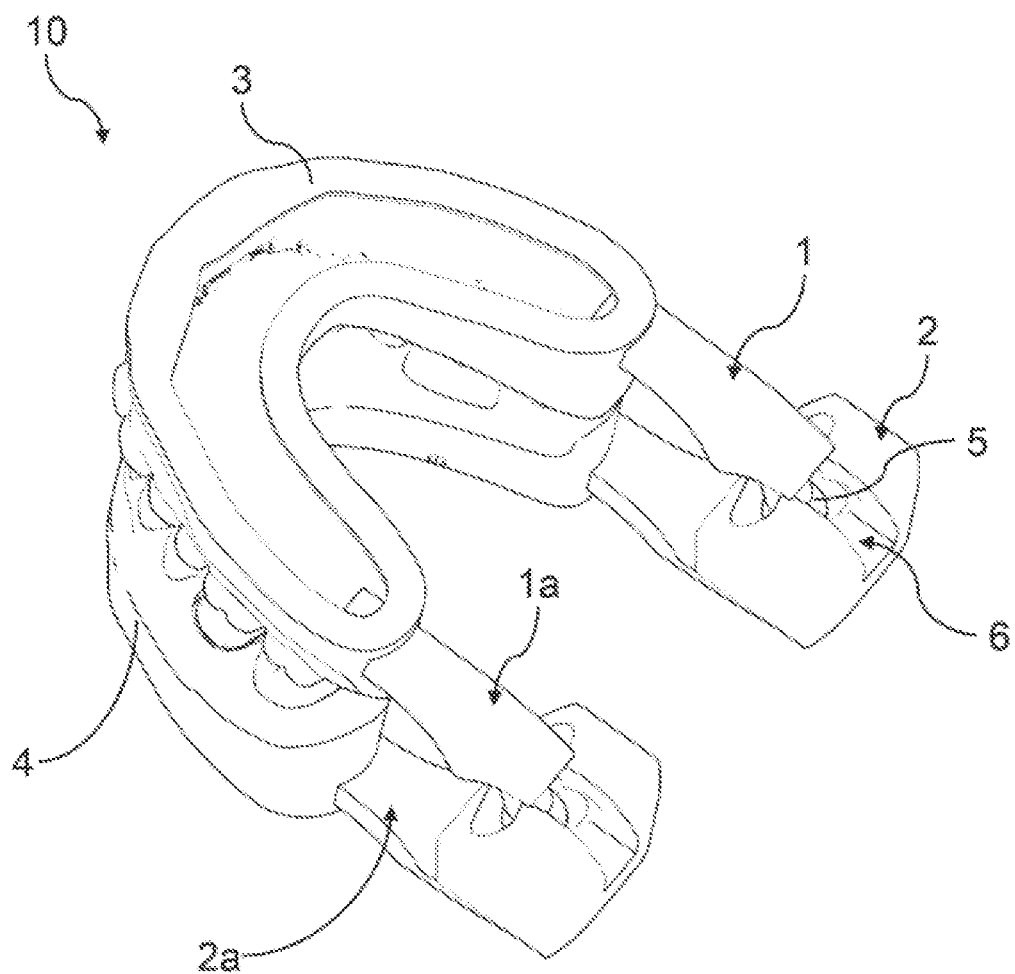
FIG. 2 shows a device for simulating jaw movements attached to a jaw model in a second three-dimensional view.

FIG. 2 shows the device 10 in a second three-dimensional view. The same or similar features are marked with the same reference signs.

Figure 3:
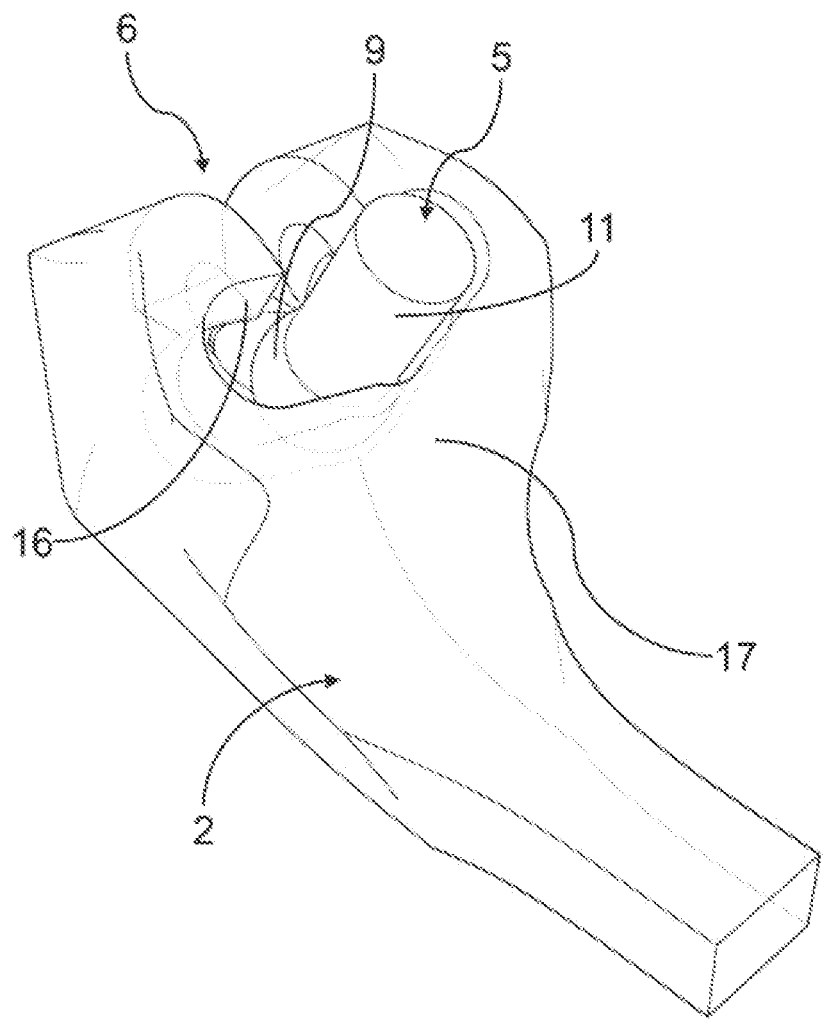
FIG. 3 shows an engagement means of a first device unit positioned within an opening of a second device unit in a three-dimensional view.

FIG. 3 shows the engagement means 5 of the first device unit 1 attached to and arranged within the openings 6 of the second device unit 2 in a three-dimensional view. The engagement means 5 comprises the spherical joint head 9 and the intermediate section 11.

Figure 4:
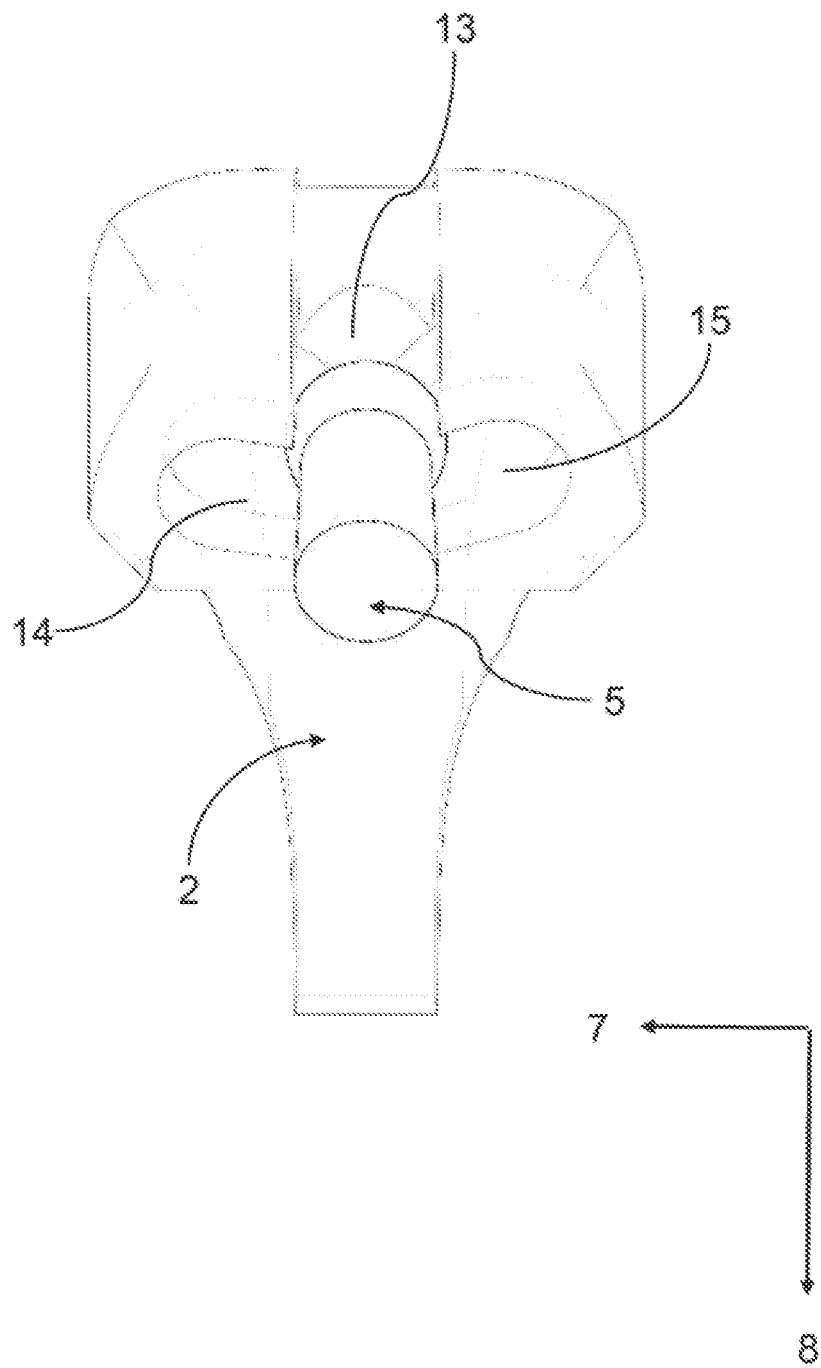
FIG. 4 shows the engagement means of the first device unit positioned within the opening of the second device unit in a top view, FIG. 5 schematically shows a first set of three openings of the second device unit, FIG. 6 schematically shows a second set of three openings of the second device unit.

FIG. 4 shows the engagement means 5 of the first device unit 1 attached to and arranged within the openings 6 of the second device unit 2 in a top view.

Referring to both FIGS. 3 and 4, the openings 6 of the second device unit 2 comprise a first opening 13, a second opening 14 and a third opening 15. The first, second and third openings 13, 14, 15 all have an elongated shape. The first opening 13 is arranged in parallel to the protrusion direction 8 and or a longitudinal direction of the elongated shaped second device unit. The second and third openings 14, 15 are arranged in parallel or approximately in parallel to the laterotrusion direction 7. In other words: The second and third openings 14, 15 each confine a respective angle with the laterotrusion direction 7 that is perpendicular to the protrusion direction 8, wherein the respective angles may be zero or different from zero. Put yet in another way: The second and third openings each confine a respective angle with the first opening 13.

The engagement means 5, in particular the spherical joint head 9 of the engagement means 5, is arranged to move within the first, second and third openings 13, 14, 15. The second device unit 2 comprises an overlapping region in which the first, second and third openings 13, 14, 15 overlap. In the arrangement exemplarily shown in FIGS. 1 to 4, the engagement means 5 is positioned within the overlapping region. From the overlapping region, the engagement means 5 may move in any of the first, second and third openings 13, 14, 15. In other words: Respective end portions of the first, second and third openings 13, 14, 15 overlap.

The openings 6 are arranged within the second device unit 2. In the arrangement exemplarily shown in FIGS. 1 to 4, the openings 6 are arranged in the inside of the second device unit 2. The second device unit 2 further comprises a guiding channel 16 connecting the openings 6 and an upper surface 17 of the second device unit 2. The intermediate section 11 reaches through the guiding channel 16, in order to connect the spherical joint head 9 with the body 12 of the first device unit 1.

The guiding channel 16 and/or the intermediate section 11 may be arranged as limiting means for limiting the movement of the engagement means 5 within the openings 6, i.e. of the upper jaw 3 model relative to the lower jaw model 4. For example, when moving the spherical joint head within the openings 6 of the second device unit 2, the spherical joint head 9 and/or the intermediate section 11 may be brought into contact with a border of the guiding channel 16.

The shape of the engagement means 5, in particular a diameter of the spherical joint head 9 and the intermediate section 11, the shape of the openings 6 and/or of the guiding channel 16 may be designed depending on a jaw movement that is to be simulated. In other words: By correspondingly determining the shape or diameter of the engagement means 5, of the openings 6 and/or of the guiding channel 16, a specific jaw movement can be simulated via a movement of the upper jaw model 3 relative to the lower jaw model 4.

The guiding channel 16 may have a diameter greater than the diameter of the spherical joint head 9, for example equal to a diameter of the one or more openings 6. Alternatively, the guiding channel 16 may have a smaller diameter than the diameter of the spherical joint head 9 and/or than the diameter of the one or more openings 6. For example, the guiding channel 16 has a smaller diameter than the diameter of the spherical joint head and a bigger diameter than the diameter of the intermediate section 11.

In one example, the engaging means 5 may be positioned within the openings 6 via the guiding channel 16. The guiding channel 16, the border of the guiding channel 16 and/or a surrounding area of the guiding channel 16 may be made of a flexible material. In that manner, a spherical joint head 9 having a greater diameter than the guiding channel 16 may be pressed through the guiding channel 16, thereby providing a clip mechanism. Additionally or alternatively, the second device unit 2 may have an entrance opening similar to the guiding channel 16, the entrance opening having, for example, a first diameter and a second diameter, wherein the first diameter is greater than the diameter of the spherical joint head 9 and the second diameter is smaller than the diameter of the spherical joint head 9.

Figure 5:
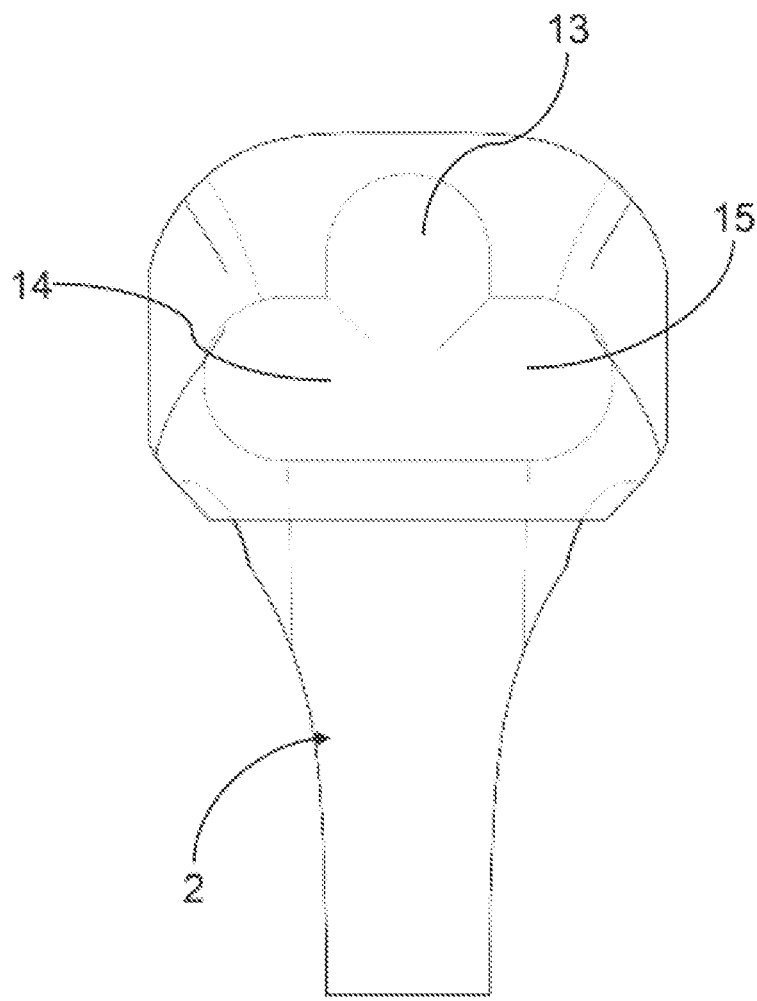
Figure 6:
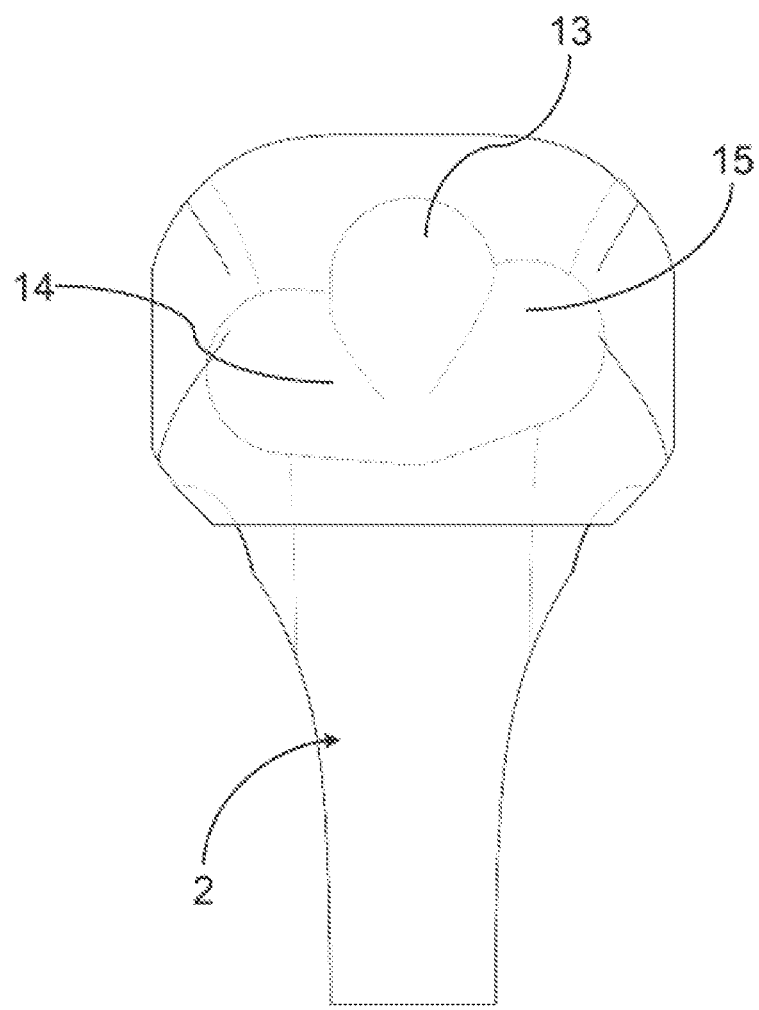

FIG. 5 and FIG. 6 show different second device units 2 having different first, second and third openings 13, 14, 15. In particular, as can be seen in in FIGS. 5 and 6, the first, second and third openings 13, 14, 15 may be shaped and/or arranged within the second device unit 2 in different ways. As mentioned above, the first, second and third openings 13, 14, 15 may confine a respective different angle with the protrusion direction 8 and/or the laterotrusion direction 7. In other words: The first, second and third openings 13, 14, 15 may confine a respective different angle with a longitudinal direction of the second device unit 2. Additionally or alternatively, the first, second and third openings 13, 14, 15 may each have differently shaped subsections, e.g. straight and/or curved subsections, that may each confine a respective different angle with the longitudinal direction of the second device unit 2.

In that manner a personalized articulator may be provided, that allows for simulating jaw movements which correspond or approximately corresponds to jaw movements of a user. A method for generating such as an articulator is described with reference to FIGS. 7 and 8.

Figure 7:
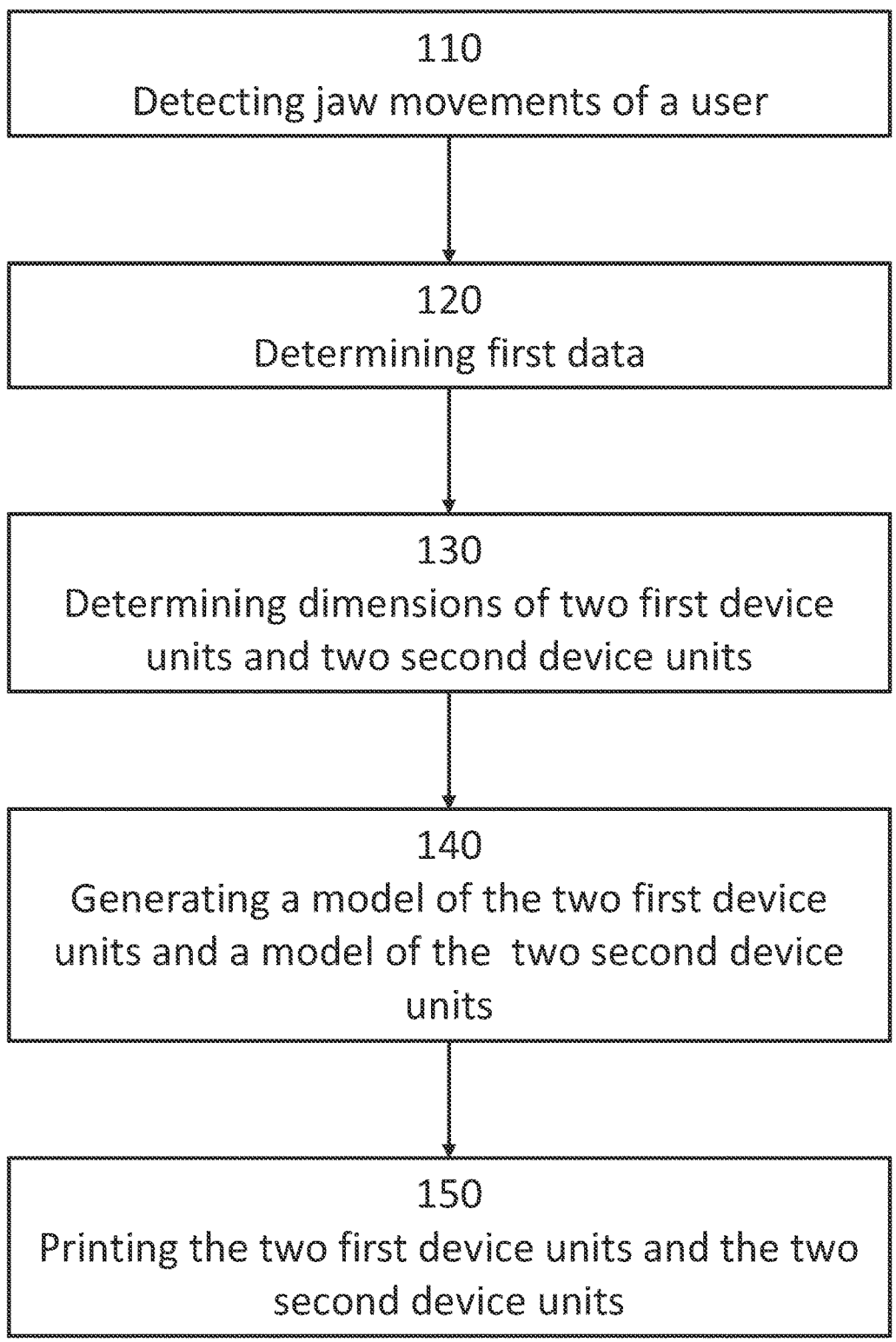
FIG. 7 shows a first flow diagram for a method for generating the device shown in FIGS. 1 and 2.

FIG. 7 shows a first method for generating any of the devices described above. Generating the device may comprise designing or generating a digital model of the device and/or designing or generating a physical model of the device.

The method starts at step 110, where a jaw movement or a plurality of jaw movements of a user is detected. Any conventional means or method for detecting jaw movements, known for example as axiography or condylographie can be used. For example, a facebow can be used to analogously or digitally detect one or more jaw movements of the user. The jaw movements of the user can comprise a direction or trajectory of the movements as well as an extension or limits of the movements, i.e. borders within which the movements can be performed.

In step 120, first data is determined that is indicative of the detected one or more jaw movements of the user. In other words: The first data represents the one or more jaw movements of the user. The first data is determined based on the detected jaw movements. The first data may comprise points, a plurality of points, lines or trajectories within a coordinate system, such as a spherical or Cartesian coordinate system. The first data may be indicative of regions, in particular within the coordinate system, in which the jaw or a jaw of the user, for example the lower and/or the upper jaw, can move or in which a movement was detected. More particularly, the first data may be indicative of the movement, detected movement, or possible movement of one or more specific points or specific parts of the jaw, for example the jaw joint.

In step 130, the dimensions of two first device units and two second device units are determined. In one example, the dimensions of one of the first device units correspond to the dimensions of the other one of the first device units. Likewise, the dimensions of one of the second device units may correspond to the dimensions of the other one of the second device units.

The dimensions of the first device units and the second device units are based on the determined first data. In particular, the dimensions of the respective engagement means of the first device units and the respective one or more openings of the second device units are determined based on the first data.

More particularly, the engagement means of both of the first device units are arranged or designed such that the engagement means, when positioned within the respective one or more openings of the corresponding second device unit, are able to perform movements corresponding to or similar to the detected jaw movements of the user. In other words: The first device unit is arranged or designed to perform movements relative to the corresponding second device unit that corresponds to, or are similar, to the detected movements of the jaw of the user, wherein the engagement means of the first device unit is positioned within the one or more openings of the corresponding second device unit.

Put in yet another way: The first device units and the second device units are arranged or designed such that when connected to or combined with jaw models of the jaw of the user, the jaw models are able configured to perform movements corresponding to the detected jaw movements of the user detected in step 110. For example, the first device units may be connected to or attached with an upper jaw model and the second device units may be connected to or attached with a lower jaw model, as shown in FIGS. 1 and 2.

In one example, the step of determining the dimensions of the first device units and the second device units comprises determining the size of the respective units, in particular a scaling factor of the respective units, for example a scaling factor of a predetermined base model of the respective units.

In one example, the step of determining the dimensions of the first device unit and the second device units may comprise determining the dimensions of the respective engagement means and the respective one or more openings. The engagement means may have a circular or spherical shape. The one or more openings may have elongated shapes. The dimensions and particular shapes of the engagement means and the one or more openings can be determined, based on the first data, such that the first and second device units can perform relative movements that correspond to the jaw movements of the user.

For example, a slope of the one or more openings can be determined, e.g. adapted, based on the determined first data, in order to allow the first device unit to perform a movement in a protrusion and/or laterotrusion direction relative to the second device unit. In other words: An angle that is confined by the elongated shape of the one or more openings, or the protrusion direction, and an elongated part of the second device unit (for example the part that is connected to or attached to the lower jaw model) can be determined, based on the first data.

The relative movement of the first device unit and the second device unit can be limited according to the jaw movement of the user, i.e. based on the first data. Said limitation can be realized by the size or shape of the one or more openings or the engagement means. For example, the engagement means may itself have an elongated shape that limits (together with limited space within the one or more openings) a rotational movement of the engagement means and thus of the first device unit relative to the second device unit.

In one example, a pair of first device units is attached to an upper jaw model and a pair of second device units is attached to a lower jaw model, wherein the engagement means of the first device units are each positioned in corresponding one or more openings of the second device units, respectively, as shown in FIGS. 1 and 2. Within said arrangement, the determination of the dimensions of the respective one or more openings may suffice to limit the rotational movement of the engagement means in a laterotrusion direction. To that and, the shape, for example the diameter, of the one or more openings may vary along its elongated shape, or a longitudinal direction of the one or more openings, in order to allow for different rotational movements of the first device units depending on the position of the engagement means within the one or more openings.

More particular, the position of the one or more openings, the particular shape or form, for example a linear or curvilinear form, the slope, the length or the diameter of the one or more openings may be determined based on the first data, in order to allow the engagement means to perform movements that correspond to or result in the detected jaw movements. In particular, the one or more openings are designed such that the engagement means, or more generally, the first device unit may only perform movements relative to the second device unit that corresponds to at least one of the jaw movements detected in step 110. Likewise, the position, the size, the diameter, or the length engagement means is correspondingly determined.

The determination of the dimensions of the first and second device units may be performed by software, such as a simulation program or similar means. Additionally, or alternatively, the determination may be performed by machine learning software or artificial intelligence, based on the determined jaw movements of the user, i.e. the first data. The machine learning software may, for example, be trained based on training first data indicative of detected training jaw movements of a training user and detected movements of one or more a first device units relative to a corresponding second device unit. Said movements of the first device units may be detected virtually or digitally, i.e. may represent simulated movements of a digital model of the first and/or second device units. Said movements of the first device units may also represent movements of a physical model of the first and/or second device units and may be detected digitally or mechanically.

In step 140, a digital model of the two first device units and a digital model of the two second device units, for which the dimensions are determined in step 130, are generated. In other words, the two first device units and the two second device units are designed. The generation of the models may be performed by computing means. Based on the generated digital models, a simulation of jaw movements of the user may be digitally performed. I.e. the devise for simulating jaw movements of the user may be a digital device.

Additionally, or alternatively, the digital models of the first device units and the second device units may be generated in step 150 via a 3D printer or via a milling process. The first and second device units may each be generated in one piece. A first device unit and a corresponding second device unit may be jointly generated, i.e. may be generated in a connected or combined state.

Figure 8:
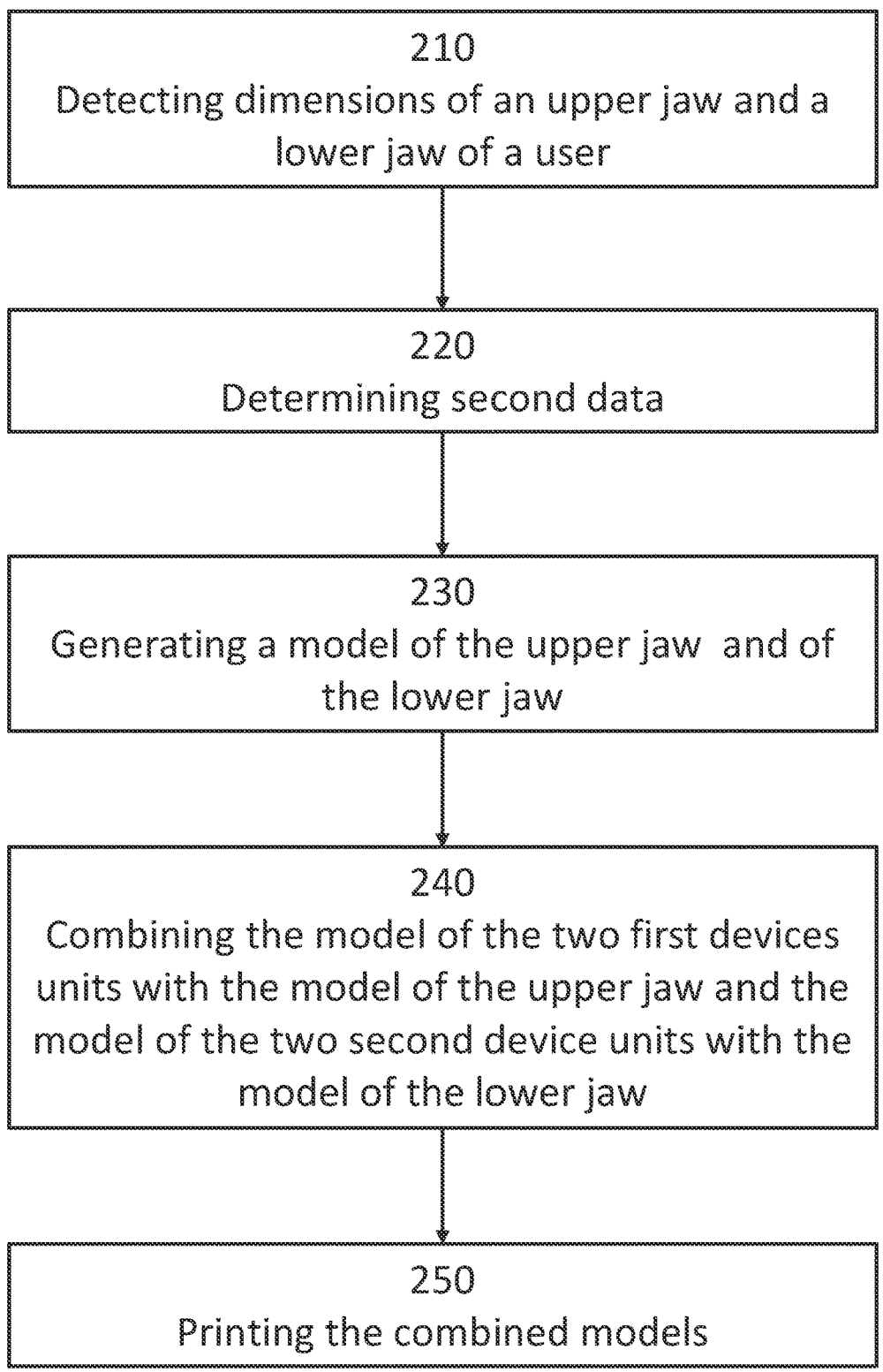
FIG. 8 shows a second flow diagram for a method for generating the device shown in FIGS. 1 and 2 attached to the jaw model.

FIG. 8 shows a flowchart of a second method for generating a device for simulating jaw movements of a user as described above.

The method starts in step 210, wherein dimensions of an upper jaw and dimensions of a lower jaw of the user are determined. The determination may be performed by a scanner, in particular by a 3D scanner or an intraoral scanner. Alternatively, the determination may be performed by scanning physical, e.g. plaster, models of the lower jaw and the upper jaw of the user.

In step 220, second data is determined, wherein the second data is indicative of the determined dimensions of the upper jaw and of the lower jaw. Similar to the first data, the second data may comprise points, a plurality of points, lines or trajectories within a coordinate system, such as a spherical or Cartesian coordinate system. In one example, determining the dimensions of the first device unit and/or the second device unit is also based on the second data. For example, the dimensions or a scale factor of the first and or second device unit is adapted to the size of the detected jaw of the user.

In step 230, a digital model of the upper jaw and a digital model of the lower jaw are generated. In other words, the upper jaw model and the lower jaw model are designed. The generation may be performed by computing means. Said digital models of the lower and upper jaw of the user may be combined, in step 240, with the digital models of the first and second device units. In particular, the models of two of the first device units are combined with the models of the upper jaw and the models of two of the second device units are combined with the model of the lower jaw. The step of combining may be based on the first and/or the second data. In particular, the models may be combined such that the upper jaw and lower jaw model are able to perform jaw movements that correspond to, or a similar to, the detected jaw movements of the user. Hence, both the dimensions of the first and second device unit and the relative arrangement of the first and second device unit and the jaw models (i.e. the upper jaw model and the lower jaw model) may be based on the first and/or second data.

Using the combined digital models, a realistic digital devise for simulating jaw movements of the user may be generated. The combined digital models may further be 3D-printed or milled, in step 250. In particular, the combined models of the first device units and the upper jaw model may be printed in one piece. The combined models of the second device units and the lower jaw model may be printed in one piece.

Figure 9:
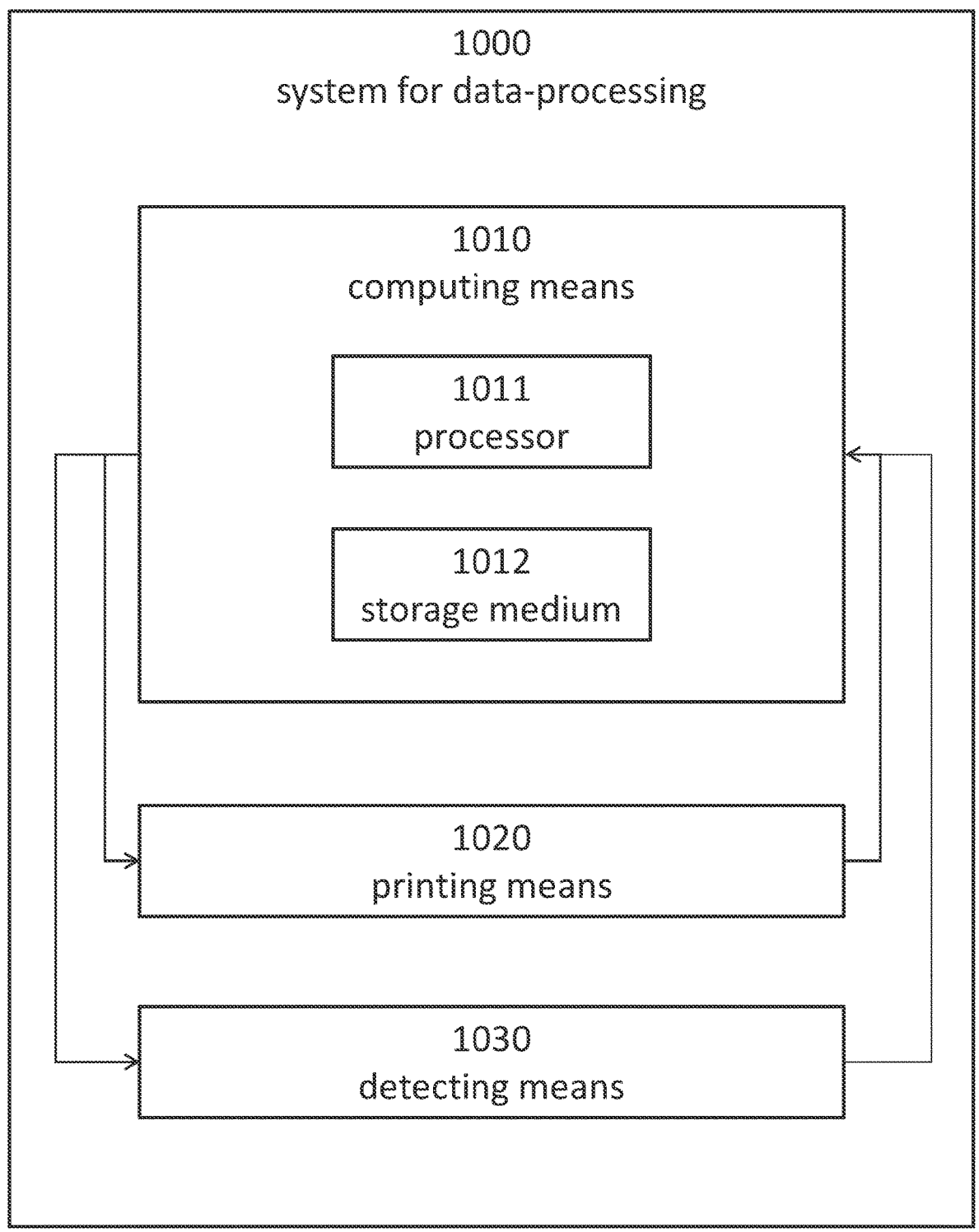
FIG. 9 shows a system for data-processing comprising means for carrying out one of the methods of FIGS. 7 and 8.

FIG. 9 shows a system 1000 for data-processing comprising means for carrying out any of the methods shown in, and described with reference to, FIGS. 7 and 8. The system 1000 comprises computing means 1010. The computing means 1010 may comprise a processor 1011 configured to perform any of the method described with reference to FIGS. 7 and 8. The computing means 1010 may further comprise a storage medium or a memory for storing instructions that, when carried out by the system 1000, cause the system 1000 to carry out any of the method described with reference to FIGS. 7 and 8.

The system 1000 further comprises printing means 1020, such as a 3D printer, communicatively coupled with the computing means 1010. The printing means may be configured to perform method steps 150 or method steps 250, of the methods as described with reference to FIGS. 7 and 8. The storage medium may further store instructions that, when communicated to and carried out by the printing means 1020, cause the printing means to carry out steps 150 or 250 of the methods described with reference to FIGS. 7 and 8.

The system 1000 further comprises detecting means 1030, such as a scanner, communicatively coupled with the computing means 1010. The detecting means 1030 may be configured to perform method steps 110 or 210 of the methods as described with reference to FIGS. 7 and 8. The storage medium may further store instructions that, when communicated to and carried out by the detecting means 1030, cause the detecting means 1030 to carry out steps 110 or 210.

The invention claimed is:

1. A device for simulating jaw movements, the device comprising:
   an upper jaw model (3);
   a lower jaw model (4);
   at least one first device unit (1) attached contiguously to the upper jaw model (3); and
   at least one second device unit (2) attached contiguously to the lower jaw model (4),
   wherein the at least one first device unit (1) comprises an engagement means (5) and the at least one second device unit (2) comprises one or more openings (6) for receiving the engagement means (5), or vice versa,
   wherein the engagement means (5) includes a spherical joint head (9) and an elongated intermediate section (11) supporting the spherical joint head (9) at a free end thereof,
   wherein the one or more openings (6) includes a first opening (13), a second opening (14), and a third opening (15) which partially overlap in an overlapping region,
   wherein the spherical joint head (9) is received within the one or more openings (6) with the spherical joint head (9) being independently receivable in each of the first opening (13), the second opening (14), and the third opening (15), and
   wherein the engagement means (5), with the spherical joint head (9) being received within the one or more openings (6), is arranged to perform a rotational movement and a translational movement within the one or more openings (6).

2. The device of claim 1, wherein the one or more openings (6) surround or encircle at least a part of the spherical joint head (9).

3. The device of claim 1,
   wherein the rotational movement and/or the translational movement of the engagement means (5) within the one or more openings (6) results in a movement of the lower jaw (3) model in a laterotrusion direction (7), a mediotrusion direction and/or a protrusion direction (8) relative to the upper jaw model (4).

4. The device of claim 1, wherein the second opening (14) is arranged non-parallel to the first opening (13), wherein the second opening (14) and the first opening (13) confine a first angle.

5. The device of claim 4, wherein the third opening (15) is arranged non-parallel to the first opening (13), wherein the third opening (15) and the first opening (13) confine a second angle, different from the first angle.

6. The device of claim 1, wherein the first opening (13) is elongated and extends outwardly from the overlapping region, wherein the second opening (14) is elongated and extends outwardly from the overlapping region, and wherein the third opening (15) is elongated and extends outwardly from the overlapping region.

7. The device of claim 6, wherein the first opening (13) extends outwardly from the overlapping region in a first direction, wherein the second opening (14) extends outwardly from the overlapping region in a second direction, the second direction being transverse to the first direction.

8. The device of claim 7, wherein the third opening (15) extends outwardly from the overlapping region in a third direction, the third direction being transverse to the first direction.

9. The device of claim 8, wherein the third direction is opposite to the second direction.

10. The device of claim 1, wherein the at least one second device unit (2) comprises the one or more openings (6), wherein a guiding channel (16) extends between the one or more openings (6) and an outer surface (17) of the at least one second device (2), and wherein the elongated intermediate section (11) extends through the guiding channel (16) with the one or more openings (6) surrounding or encircling at least a portion of the spherical joint head (9).

11. The device of claim 1, wherein at least one of: i. the at least one first device unit (1) is non-rotatably attached to the upper jaw model (3); and, ii. the at least one second device unit (2) is non-rotatably attached to the lower jaw model (4).

12. The device of claim 1, wherein the first opening (13), the second opening (14), and the third opening (15) are differently shaped.

13. The device of claim 1, wherein at least one of: i. the at least one first device (1) is formed as one piece with the upper jaw model (3); and, ii. the at least one second device (2) is formed as one piece with the lower jaw model (4).

* * * * *